United States Patent
Rais et al.

(10) Patent No.: US 8,830,227 B2
(45) Date of Patent: Sep. 9, 2014

(54) DEPTH-BASED GAIN CONTROL

(75) Inventors: Dmitry Rais, Ramat Gan (IL); Daniel Cohen, Tel Aviv (IL); Erez Sali, Savyon (IL)

(73) Assignee: Primesense Ltd., Tel Aviv (IL)

( * ) Notice: Subject to any disclaimer, the term of this patent is extended or adjusted under 35 U.S.C. 154(b) by 940 days.

(21) Appl. No.: 12/958,427

(22) Filed: Dec. 2, 2010

(65) Prior Publication Data

US 2011/0134114 A1 Jun. 9, 2011

Related U.S. Application Data (60) Provisional application No. 61/267,050, filed on Dec. 6, 2009.

(51) Int. Cl.
*G06T 15/00* (2011.01)
*H04N 13/02* (2006.01)
*G06T 7/00* (2006.01)

(52) U.S. Cl.
CPC .......... *H04N 13/0253* (2013.01); *G06T 7/0057* (2013.01)
USPC .......................................... 345/419; 348/255

(58) Field of Classification Search
CPC .................... G06T 7/0057; G06T 2207/10028
USPC .......................................... 345/419; 348/255
See application file for complete search history.

(56) References Cited

U.S. PATENT DOCUMENTS

| | | |
|---|---|---|
| 4,336,978 A | 6/1982 | Suzuki |
| 4,542,376 A | 9/1985 | Bass et al. |
| 4,802,759 A | 2/1989 | Matsumoto |
| 4,843,568 A | 6/1989 | Krueger et al. |
| 5,075,562 A | 12/1991 | Greivenkamp et al. |
| 5,483,261 A | 1/1996 | Yasutake |
| 5,630,043 A | 5/1997 | Uhlin |
| 5,636,025 A | 6/1997 | Bieman et al. |
| 5,712,682 A | 1/1998 | Hannah |
| 5,835,218 A | 11/1998 | Harding |
| 5,838,428 A | 11/1998 | Pipitone et al. |
| 5,856,871 A | 1/1999 | Cabib et al. |
| 5,909,312 A | 6/1999 | Mendlovic et al. |
| 6,041,140 A | 3/2000 | Binns et al. |
| 6,081,269 A | 6/2000 | Quarendon |
| 6,084,712 A | 7/2000 | Harding |

(Continued)

FOREIGN PATENT DOCUMENTS

| | | |
|---|---|---|
| DE | 19736169 A1 | 8/1997 |
| DE | 19638727 A1 | 3/1998 |

(Continued)

OTHER PUBLICATIONS

Japanese Patent Application # 2008558981 Official Action dated Nov. 2, 2011.

(Continued)

*Primary Examiner* — Kee M Tung
*Assistant Examiner* — Peter Hoang
(74) *Attorney, Agent, or Firm* — D. Kligler I.P. Services Ltd.

(57) ABSTRACT

A method for depth mapping includes capturing an electronic image of a scene using an imaging device. The electronic image is processed to generate depth data with respect to the scene. The gain of the imaging device is set responsively to the depth data.

12 Claims, 3 Drawing Sheets

(56) References Cited

U.S. PATENT DOCUMENTS

| | | |
|---|---|---|
| 6,088,105 A | 7/2000 | Link |
| 6,099,134 A | 8/2000 | Taniguchi et al. |
| 6,100,517 A | 8/2000 | Yahav et al. |
| 6,101,269 A | 8/2000 | Hunter et al. |
| 6,108,036 A | 8/2000 | Harada et al. |
| 6,167,151 A | 12/2000 | Albeck |
| 6,259,561 B1 | 7/2001 | George et al. |
| 6,262,740 B1 | 7/2001 | Lauer et al. |
| 6,268,923 B1 | 7/2001 | Michniewicz et al. |
| 6,301,059 B1 | 10/2001 | Huang et al. |
| 6,377,700 B1 | 4/2002 | Mack et al. |
| 6,438,263 B2 | 8/2002 | Albeck et al. |
| 6,494,837 B2 | 12/2002 | Kim et al. |
| 6,495,848 B1 | 12/2002 | Rubbert |
| 6,686,921 B1 | 2/2004 | Rushmeier et al. |
| 6,700,669 B1 | 3/2004 | Geng |
| 6,731,391 B1 | 5/2004 | Kao et al. |
| 6,741,251 B2 | 5/2004 | Malzbender |
| 6,750,906 B1 | 6/2004 | Itani et al. |
| 6,751,344 B1 | 6/2004 | Grumbine |
| 6,754,370 B1 | 6/2004 | Hall-Holt et al. |
| 6,759,646 B1 | 7/2004 | Acharya et al. |
| 6,803,777 B2 | 10/2004 | Pfaff et al. |
| 6,810,135 B1 | 10/2004 | Berenz et al. |
| 6,813,440 B1 | 11/2004 | Yu et al. |
| 6,825,985 B2 | 11/2004 | Brown et al. |
| 6,841,780 B2 | 1/2005 | Cofer et al. |
| 6,859,326 B2 | 2/2005 | Sales |
| 6,937,348 B2 | 8/2005 | Geng |
| 7,006,952 B1 | 2/2006 | Matsumoto et al. |
| 7,009,742 B2 | 3/2006 | Brotherton-Ratcliffe et al. |
| 7,013,040 B2 | 3/2006 | Shiratani |
| 7,076,024 B2 | 7/2006 | Yokhin |
| 7,112,774 B2 | 9/2006 | Baer |
| 7,120,228 B2 | 10/2006 | Yokhin et al. |
| 7,127,101 B2 | 10/2006 | Littlefield et al. |
| 7,194,105 B2 | 3/2007 | Hersch et al. |
| 7,231,069 B2 | 6/2007 | Nahata |
| 7,256,899 B1 | 8/2007 | Faul et al. |
| 7,335,898 B2 | 2/2008 | Donders et al. |
| 7,369,685 B2 | 5/2008 | DeLean |
| 7,385,708 B2 | 6/2008 | Ackerman et al. |
| 7,433,024 B2 | 10/2008 | Garcia et al. |
| 7,551,719 B2 | 6/2009 | Yokhin et al. |
| 7,560,679 B1 | 7/2009 | Gutierrez |
| 7,659,995 B2 | 2/2010 | Knighton et al. |
| 7,700,904 B2 | 4/2010 | Toyoda et al. |
| 7,751,063 B2 | 7/2010 | Dillon et al. |
| 7,811,825 B2 | 10/2010 | Fauver et al. |
| 7,840,031 B2 | 11/2010 | Albertson et al. |
| 7,952,781 B2 | 5/2011 | Weiss et al. |
| 8,018,579 B1 | 9/2011 | Krah |
| 8,035,806 B2 | 10/2011 | Jin et al. |
| 8,126,261 B2 | 2/2012 | Medioni et al. |
| 8,326,025 B2 | 12/2012 | Boughorbel |
| 2001/0016063 A1 | 8/2001 | Albeck et al. |
| 2002/0041327 A1 | 4/2002 | Hildreth et al. |
| 2002/0075456 A1 | 6/2002 | Shiratani |
| 2003/0048237 A1 | 3/2003 | Sato et al. |
| 2003/0057972 A1 | 3/2003 | Pfaff et al. |
| 2003/0156756 A1 | 8/2003 | Gokturk et al. |
| 2004/0001145 A1 | 1/2004 | Abbate |
| 2004/0063235 A1 | 4/2004 | Chang |
| 2004/0105580 A1 | 6/2004 | Hager et al. |
| 2004/0130730 A1 | 7/2004 | Cantin et al. |
| 2004/0130790 A1 | 7/2004 | Sales |
| 2004/0174770 A1 | 9/2004 | Rees |
| 2004/0213463 A1 | 10/2004 | Morrison |
| 2004/0218262 A1 | 11/2004 | Chuang et al. |
| 2004/0228519 A1 | 11/2004 | Littlefield et al. |
| 2004/0264764 A1 | 12/2004 | Kochi et al. |
| 2005/0018209 A1 | 1/2005 | Lemelin et al. |
| 2005/0052637 A1 | 3/2005 | Shaw et al. |
| 2005/0111705 A1 | 5/2005 | Waupotitsch et al. |
| 2005/0134582 A1 | 6/2005 | Claus et al. |
| 2005/0135555 A1 | 6/2005 | Claus et al. |
| 2005/0200838 A1 | 9/2005 | Shaw et al. |
| 2005/0200925 A1 | 9/2005 | Brotherton-Ratcliffe et al. |
| 2005/0231465 A1 | 10/2005 | DePue et al. |
| 2005/0271279 A1 | 12/2005 | Fujimura et al. |
| 2006/0017656 A1 | 1/2006 | Miyahara |
| 2006/0072851 A1 | 4/2006 | Kang et al. |
| 2006/0156756 A1 | 7/2006 | Becke |
| 2006/0221218 A1 | 10/2006 | Adler et al. |
| 2006/0221250 A1 | 10/2006 | Rossbach et al. |
| 2006/0269896 A1 | 11/2006 | Liu et al. |
| 2007/0057946 A1 | 3/2007 | Albeck et al. |
| 2007/0060336 A1 | 3/2007 | Marks et al. |
| 2007/0133840 A1 | 6/2007 | Cilia |
| 2007/0165243 A1 | 7/2007 | Kang et al. |
| 2007/0262985 A1* | 11/2007 | Watanabe et al. ............ 345/420 |
| 2008/0018595 A1 | 1/2008 | Hildreth et al. |
| 2008/0031513 A1 | 2/2008 | Hart |
| 2008/0037829 A1 | 2/2008 | Givon |
| 2008/0106746 A1 | 5/2008 | Shpunt et al. |
| 2008/0118143 A1 | 5/2008 | Gordon et al. |
| 2008/0198355 A1 | 8/2008 | Domenicali et al. |
| 2008/0212835 A1 | 9/2008 | Tavor |
| 2008/0240502 A1 | 10/2008 | Freedman et al. |
| 2008/0247670 A1 | 10/2008 | Tam et al. |
| 2008/0278572 A1 | 11/2008 | Gharib et al. |
| 2008/0285827 A1 | 11/2008 | Meyer et al. |
| 2009/0016642 A1 | 1/2009 | Hart |
| 2009/0046152 A1 | 2/2009 | Aman |
| 2009/0059062 A1* | 3/2009 | Toguchi ........................ 348/349 |
| 2009/0060307 A1 | 3/2009 | Ghanem et al. |
| 2009/0096783 A1 | 4/2009 | Shpunt et al. |
| 2009/0183125 A1 | 7/2009 | Magal et al. |
| 2009/0183152 A1 | 7/2009 | Yang et al. |
| 2009/0185274 A1 | 7/2009 | Shpunt |
| 2009/0226079 A1 | 9/2009 | Katz et al. |
| 2009/0244309 A1 | 10/2009 | Maison et al. |
| 2009/0244317 A1* | 10/2009 | Makii ........................ 348/229.1 |
| 2010/0007717 A1 | 1/2010 | Spektor et al. |
| 2010/0013860 A1 | 1/2010 | Mandella et al. |
| 2010/0020078 A1 | 1/2010 | Shpunt |
| 2010/0118123 A1 | 5/2010 | Freedman et al. |
| 2010/0128221 A1 | 5/2010 | Muller et al. |
| 2010/0142014 A1 | 6/2010 | Rosen et al. |
| 2010/0177164 A1 | 7/2010 | Zalevsky |
| 2010/0182406 A1 | 7/2010 | Benitez |
| 2010/0194745 A1 | 8/2010 | Leister et al. |
| 2010/0201811 A1 | 8/2010 | Garcia et al. |
| 2010/0225746 A1 | 9/2010 | Shpunt et al. |
| 2010/0243899 A1 | 9/2010 | Ovsiannikov et al. |
| 2010/0245826 A1 | 9/2010 | Lee |
| 2010/0265316 A1 | 10/2010 | Sali et al. |
| 2010/0278384 A1 | 11/2010 | Shotton et al. |
| 2010/0284082 A1 | 11/2010 | Shpunt et al. |
| 2010/0290698 A1 | 11/2010 | Shpunt et al. |
| 2010/0303289 A1 | 12/2010 | Polzin et al. |
| 2011/0001799 A1 | 1/2011 | Rothenberger et al. |
| 2011/0025827 A1 | 2/2011 | Shpunt et al. |
| 2011/0043403 A1 | 2/2011 | Loffler |
| 2011/0074932 A1 | 3/2011 | Gharib et al. |
| 2011/0096182 A1 | 4/2011 | Cohen et al. |
| 2011/0158508 A1 | 6/2011 | Shpunt et al. |
| 2011/0211044 A1 | 9/2011 | Shpunt et al. |
| 2011/0279648 A1 | 11/2011 | Lutian et al. |
| 2011/0285910 A1 | 11/2011 | Bamji et al. |
| 2011/0310125 A1 | 12/2011 | Mceldowney et al. |
| 2012/0012899 A1 | 1/2012 | Jin et al. |
| 2012/0051588 A1 | 3/2012 | Mceldowney |

FOREIGN PATENT DOCUMENTS

| | | |
|---|---|---|
| GB | 2352901 A | 2/2001 |
| JP | 62206684 A | 9/1987 |
| JP | 01-240863 | 9/1989 |
| JP | 03-029806 U | 2/1991 |
| JP | H03-040591 A | 2/1991 |
| JP | 06-273432 | 9/1994 |
| JP | H08-186845 A | 7/1996 |
| JP | H10-327433 A | 12/1998 |

(56) References Cited

FOREIGN PATENT DOCUMENTS

| JP | 2000131040 A | 5/2000 |
|---|---|---|
| JP | 2001141430 A | 5/2001 |
| JP | 2002122417 A | 4/2002 |
| JP | 2002-152776 A | 5/2002 |
| JP | 2002-213931 A | 7/2002 |
| JP | 2002-365023 A | 12/2002 |
| JP | 2006-128818 A | 5/2006 |
| WO | 9303579 A1 | 2/1993 |
| WO | 9827514 A2 | 6/1998 |
| WO | 9828593 A1 | 7/1998 |
| WO | 9828593 A2 | 7/1998 |
| WO | 2005010825 A2 | 2/2005 |
| WO | 2007043036 A1 | 4/2007 |
| WO | 2007096893 A2 | 8/2007 |
| WO | 2007105205 A2 | 9/2007 |
| WO | 2007105215 A2 | 9/2007 |
| WO | 2008120217 A2 | 10/2008 |

OTHER PUBLICATIONS

U.S. Appl. No. 12/522,171 Official Action dated Dec. 22, 2011.
U.S. Appl. No. 12/522,172 Official Action dated Nov. 30, 2011.
Japanese Patent Application # 2008558984 Official Action dated Nov. 1, 2011.
U.S. Appl. No. 13/043,488 Official Action dated Jan. 3, 2012.
Japanese Patent Application # 2008535179 Official Action dated Nov. 8, 2011.
Chinese Patent Application # 2006800038004.2 Official Action dated Nov. 24, 2011.
Marcia et al., "Superimposed Video Disambiguation for Increased Field of View", Optics Express 16:21, pp. 16352-16363, year 2008.
Guan et al., "Composite Structured Light Pattern for Three Dimensional Video", Optics Express 11:5, pp. 406-417, year 2008.
U.S. Appl. No. 13/311,584, filed Dec. 6, 2011.
PCT Application PCT/IB2011/055155 filed on Nov. 17, 2011.
International Application No. PCT/IB2010/053430 Search Report dated Dec. 28, 2010.
Chinese Patent Application # 200680038004.2 Official Action dated Dec. 24, 2010.
Yao Kun et al., "Measurnnent of Space Distribution of Laser Gaussian Beam by Speckles Displacement Method", High Power Laser and Particle Beams, vol. 12, No. 2, pp. 141-144, Apr. 30, 2000.
Zhu et al., "Fusion of time-of-flight depth and stereo for high accuracy depth maps", Proceedings of the IEEE Conference on Computer Vision and Pattern Recognition, pp. 1-8, Jun. 23, 2008.
Koschan et al., "Dense Depth Maps by Active Color Illumination and Image Pyramids", Advances in Computer Vision, pp. 137-148, 1997.
Scharstein et al., "High-Accuracy Stereo Depth Maps Using Structured Light", IEEE Proceedings of the Computer Society Conference on Computer Vision and Pattern Recognition, pp. 165-171, Jun. 18, 2003.
Chinese Patent Application # 200780016625.5 Official Action dated Oct. 26, 2010.
Chinese Patent Application # 200780006560.6 Official Action dated Feb. 1, 2011.
U.S. Appl. No. 13/541,775, filed Jul. 5, 2012.
U.S. Appl. No. 12/282,517 Official Action dated Jun. 12, 2012.
U.S. Appl. No. 12/522,172 Official Action dated Jun. 29, 2012.
U.S. Appl. No. 12/703,794 Official Action dated Aug. 7, 2012.
U.S. Appl. No. 12/522,176 Official Action dated Aug. 2, 2012.
JP Patent Application # 2008558984 Office Action dated Jul. 3, 2012.
Japanese Patent Application # 2011-517308 Office Action dated Jun. 19, 2013.
U.S. Appl. No. 13/036,023 Office Action dated Jul. 17, 2013.
U.S. Appl. No. 12/707,678 Office Action dated Jun. 20, 2013.
International Application PCT/IB2013/051189 Search Report dated Jun. 18, 2013.
U.S. Appl. No. 13/036,023 Office Action dated Sep. 3, 2013.
Hart, D., U.S. Appl. No. 09/616,606 "Method and System for High Resolution , Ultra Fast 3-D Imaging" filed Jul. 14, 2000.
International Application PCT/IL2007/000306 Search Report dated Oct. 2, 2008.
International Application PCT/IL20027/000262 Search Report dated Oct. 16, 2008.
International Application PCT/IL2008/000458 Search Report dated Oct. 28, 2008.
International Application PCT/IL2008/000327 Search Report dated Sep. 26, 2008.
International Application PCT/IL2006/000335 Preliminary Report on Patentability dated Apr. 24, 2008.
Sazbon et al., "Qualitative real-time range extraction for preplanned scene partitioning using laser beam coding", Pattern Recognition Letters 26, pp. 1772-1781, year 2005.
Sjodahl et al., "Measurement of shape by using projected random and patterns and temporal digital speckle photography", Applied Optics, vol. 38, No. 10, Apr. 1, 1999.
Garcia et al., "Three dimensional mapping and range measurement by means of projected speckle patterns", Applied Optics, vol. 47, No. 16, Jun. 1, 2008.
Chen et al., "Measuring of a Three-Dimensional Surface by Use of a Spatial Distance Computation", Applied Optics, vol. 42, issue 11, pp. 1958-1972, 2003.
Ypsilos et al., "Speech-driven Face Synthesis from 3D Video", 2nd International Symposium on 3D Processing, Visualization and Transmission, Thessaloniki, Greece, Sep. 6-9, 2004.
S.G. Hanson, et al. "Optics and Fluid Dynamics Department", Annual Progress Report for 1997 (an abstract).
Ypsilos et al., "Video-rate capture of Dynamic Face Shape and Appearance", Sixth IEEE International Conference on Automatic Face and Gesture Recognition (FGR 2004), Seoul, Korea, May 17-19, 2004.
Goodman, J.W., "Statistical Properties of Laser Speckle Patterns", Laser Speckle and Related Phenomena, pp. 9-75, Springer-Verlag, Berlin Heidelberg, 1975.
Dainty, J.C., "Introduction", Laser Speckle and Related Phenomena, pp. 1-7, Springer-Verlag, Berlin Heidelberg, 1975.
Avidan et al., "Trajectory triangulation: 3D reconstruction of moving points from amonocular image sequence", IEEE Transactions on Pattern Analysis and Machine Intelligence, vol. 22, No. 4, pages, Apr. 2000.
Leclerc et al., "The direct computation of height from shading", Proceedings of Computer Vision and Pattern Recognition, pp. 552-558, year 1991.
Zhang et al., "Height recovery from intensity gradients", Proceedings of IEEE Computer Society Conference on Computer Vision and Pattern Recognition, pp. 508-513, year 1994.
Zigelman et al., "Texture mapping using surface flattening via multidimensional scaling", IEEE Transactions on Visualization and Computer Graphics, 8 (2), pp. 198-207, year 2002.
Kimmel et al., Analyzing and synthesizing images by evolving curves with the Osher-Sethian method, International Journal of Computer Vision, 24(1), pp. 37-56 , year 1997.
Koninckx et al., "Efficient, Active 3D Acquisition, based on a Pattern-Specific Snake", Luc Van Gool (Editor), (DAGM 2002) Pattern Recognition, Lecture Notes in Computer Science 2449, pp. 557-565, Springer 2002.
Horn, B., "Height and gradient from shading", International Journal of Computer Vision, No. 5, pp. 37-76, year 1990.
Bruckstein, A., "On shape from shading", Computer Vision, Graphics, and Image Processing, vol. 44, pp. 139-154, year 1988.
Zhang et al., "Rapid Shape Acquisition Using Color Structured Light and Multi-Pass Dynamic Programming", 1st International Symposium on 3D Data Processing Visualization and Transmission (3DPVT), Padova, Italy, Jul. 2002.
Besl, P., "Active Optical Range Imaging Sensors", Machine Vision and Applications, No. 1, pp. 127-152, USA 1988.
Horn et al., "Toward optimal structured light patterns", Proceedings of International Conference on Recent Advances in 3D Digital Imaging and Modeling, pp. 28-37, Ottawa, Canada, May 1997.
Mendlovic, et al., "Composite harmonic filters for scale, projection and shift invariant pattern recognition", Applied Optics, vol. 34, No. 2, pp. 310-316, Jan. 10, 1995.

(56) References Cited

OTHER PUBLICATIONS

Asada et al., "Determining Surface Orientation by Projecting a Stripe Pattern", IEEE Transactions on Pattern Analysis and Machine Intelligence, vol. 10, No. 5, year 1988.

Winkelbach et al., "Shape from Single Stripe Pattern Illumination", Luc Van Gool (Editor), (DAGM 2002) Patter Recognition, Lecture Notes in Computer Science 2449, p. 240-247, Springer 2002.

Mor et al., U.S. Appl. No. 12/762,373 "Synchronization of Projected Illumination with Rolling Shutter of Image Sensor" filed Apr. 19, 2010.

Petronius et al., U.S. Appl. No. 61/300,465 "Integrated Photonics Module for Optical Projection" filed Feb. 2, 2010.

Luxtera Inc., "Luxtera Announces World's First 10GBit CMOS Photonics Platform", Carlsbad, USA, Mar. 28, 2005 (press release).

Lee et al., "Variable Pulse Mode Driving IR Source Based 3D Robotic Camera", MVA2005 IAPR Conference on Machine Vision Applications, pp. 530-533, Japan, May 16-18, 2005.

Mordohai et al., "Tensor Voting: A Perceptual Organization Approach to Computer Vision and Machine Learning", Synthesis Lectures on Image, Video and Multimedia Processing, issue No. 8, Publishers Morgan and Claypool, year 2006.

Beraldin et al., "Active 3D Sensing", Scuola Normale Superiore Pisa, vol. 10, pp. 22-46, Apr. 2000.

Bhat et al., "Ordinal Measures for Image Correspondence", IEEE Transactions on Pattern Analysis and Machine Intelligence, vol. 20, No. 4, pp. 415-423, Apr. 1998.

Bradley et al., "Synchronization and Rolling Shutter Compensation for Consumer Video Camera Arrays", IEEE International Workshop on Projector-Camera Systems—PROCAMS 2009 (Miami Beach, Florida, 2009).

De Piero et al., "3D Computer Vision Using Structured Light: Design Calibration and Implementation Issues", Advances in Computers, vol. 43, pp. 243-278, Academic Press 1996.

Hongjun et al., "Shape Measurement by Digital Speckle Temporal Sequence Correlation Method", Acta Optica Sinica Journal, vol. 21, No. 10, pp. 1208-1213, Oct. 2001 (with English abstract).

Hongjun, D., "Digital Speckle Temporal Sequence Correlation Method and the Application in Three-Dimensional Shape Measurement", Chinese Doctoral Dissertations & Master's Theses, Full-text Database (Master) Basic Sciences, No. 1, Mar. 15, 2004.

Hsueh et al., "Real-time 3D Topography by Speckle Image Correlation", Proceedings of SPIE Conference on Input/Output and Imaging Technologies, vol. 3422, pp. 108-112, Taiwan, Jul. 1998.

Chinese Patent Application # 200780009053.8 Official Action dated Apr. 15, 2010 (English translation).

Chinese Patent Application # 200680038004.2 Official Action dated Mar. 30, 2010 (English translation).

Zhu et al., "Fusion of Time-of-Flight Depth and Stereo for High Accuracy Depth Maps", Proceedings of the IEEE Conference on Computer Vision and Pattern Recognition, Anchorage, USA, Jun. 24-26, 2008.

EZconn Czech A.S., "Site Presentation", Oct. 2009.

Abramson, N., "Holographic Contouring by Translation", Applied Optics Journal, vol. 15, No. 4, pp. 1018-1976, Apr. 1976.

Achan et al., "Phase Unwrapping by Minimizing Kikuchi Free Energy", IEEE International Geoscience and Remote Sensing Symposium, pp. 1738-1740, Toronto, Canada, Jun. 2002.

Theocaris et al., "Radial Gratings as Moire Gauges", Journal of Scientific Instruments (Journal of Physics E), series 2, vol. 1, year 1968.

Cohen et al., U.S. Appl. No. 12/605,340 "Error Compensation in Three-Dimensional Mapping" filed Oct. 25, 2009.

International Application PCT/IL2009/000285 Search Report dated Jun. 11, 2009.

Brooks et al., "Moire Gauging Using Optical Interference Patterns", Applied Optics Journal, vol. 8, No. 5, pp. 935-940, May 1969.

Hovanesian et al., "Moire Contour-Sum Contour-Difference, and Vibration Analysis of Arbitrary Objects", Applied Optics Journal, vol. 10, No. 12, pp. 2734-2738, Dec. 1971.

Bryngdahl, O., "Characteristics of Superposed Patterns in Optics", Journal of Optical Society of America, vol. 66, No. 2, pp. 87-94, Feb. 1976.

International Application PCT/IL2008/000095 Search Report dated Jul. 24, 2008.

Chen et al., "Overview of Three-Dimensional Shape Measurement Using Optical Methods", Society of Photo-Optical Instrumentation Engineers Journal 39(1), pp. 10-22, Jan. 2000.

Cohen et al., "High-Resolution X-ray Diffraction for Characterization and Monitoring of Silicon-On-Insulator Fabrication Processes", Applied Physics Journal, vol. 93, No. 1, pp. 245-250, Jan. 2003.

Zhang et al., "Shape from intensity gradient", IEEE Transactions on Systems, Man and Cybernetics—Part A: Systems and Humans, vol. 29, No. 3, pp. 318-325, May 1999.

Doty, J.L., "Projection Moire for Remote Contour Analysis", Journal of Optical Society of America, vol. 73, No. 3, pp. 366-372, Mar. 1983.

Ben Eliezer et al., "Experimental Realization of an Imaging System with an Extended Depth of Field", Applied Optics Journal, vol. 44, No. 14, pp. 2792-2798, May 10, 2005.

Tay et al., "Grating Projection System for Surface Contour Measurement", Applied Optics Journal, vol. 44, No. 8, pp. 1393-1400, Mar. 10, 2005.

Takeda et al., "Fourier Transform Methods of Fringe-Pattern Analysis for Computer-Based Topography and Interferometry", Journal of Optical Society of America, vol. 72, No. 1, Jan. 1982.

Takasaki, H., "Moire Topography", Applied Optics Journal, vol. 12, No. 4, pp. 845-850, Apr. 1973.

Takasaki, H., "Moire Topography", Applied Optics Journal, vol. 9, No. 6, pp. 1467-1472, Jun. 1970.

Hildebrand et al., "Multiple-Wavelength and Multiple-Source Holography Applied to Contour Generation", Journal of Optical Society of America Journal, vol. 57, No. 2, pp. 155-162, Feb. 1967.

Su et al., "Application of Modulation Measurement Profilometry to Objects with Surface Holes", Applied Optics Journal, vol. 38, No. 7, pp. 1153-1158, Mar. 1, 1999.

Spektor et al., U.S. Appl. No. 61/162,309 "Integrated Chip with Experience Understanding" filed Mar. 22, 2009.

Hung et al., "Time-Averaged Shadow-Moire Method for Studying Vibrations", Applied Optics Journal, vol. 16, No. 6, pp. 1717-1719, Jun. 1977.

Idesawa et al., "Scanning Moire Method and Automatic Measurement of 3-D Shapes", Applied Optics Journal, vol. 16, No. 8, pp. 2152-2162, Aug. 1977.

Iizuka, K., "Divergence-Ratio Axi-Vision Camera (Divcam): A Distance Mapping Camera", Review of Scientific Instruments 77, 0451111 (2006).

Lim et al., "Additive Type Moire with Computer Image Processing", Applied Optics Journal, vol. 28, No. 13, pp. 2677-2680, Jul. 1, 1989.

Piestun et al., "Wave Fields in Three Dimensions: Analysis and Synthesis", Journal of the Optical Society of America, vol. 13, No. 9, pp. 1837-1848, Sep. 1996.

Post et al., "Moire Methods for Engineering and Science—Moire Interferometry and Shadow Moire", Photomechanics (Topics in Applied Physics), vol. 77, pp. 151-196, Springer Berlin / Heidelberg, Jan. 1, 2000.

Chinese Patent Application # 200780006560.6 Official Action dated Oct. 11, 2010.

International Application PCT/IB20101053430 Search Report dated Dec. 28, 2010.

Scharstein et al., "High-Accuracy Stereo Depth Maps Using Structured Light", IEEE Proceedings of the Conference on Computer Vision and Pattern Recognition, pp. 165-171, Jun. 18, 2003.

Koschan et al., Dense Depth Maps by Active Color Illumination and Image Pyramids, Advances in Computer Vision, pp. 137-148, Springer 1997.

Marcia et al., "Fast Disambiguation of Superimposed Images for Increased Field of View", IEEE International Conference on Image Processing, San Diego, USA, Oct. 12-15, 2008.

Microvision Inc., "Micro-Electro-Mechanical System (MEMS) Scanning Mirror", years 1996-2009.

U.S. Appl. No. 61/372,729 "Scanning projectors for 3D mapping" filed Aug. 11, 2010.

(56) References Cited

OTHER PUBLICATIONS

U.S. Appl. No. 61/425,788 "Scanning projectors and image capture modules" filed Dec. 22, 2010.
U.S. Appl. No. 61/415,352 "Depth mapping using time-coded illumination" filed Nov. 19, 2010.
U.S. Appl. No. 61/419,891 "Lens Arrays for Pattern Projection and Imaging" filed Dec. 6, 2010.
U.S. Appl. No. 61/309,000 "Commitment-Based Resource Allocation for 3D Mapping" filed Mar. 1, 2010.
Btendo, "Two Uni-axial Scanning Mirrors Vs One Bi-axial Scanning Mirror", Kfar Saba, Israel, Aug. 13, 2008.
Shpunt et al., U.S. Appl. No. 12/844,864 "Pattern-based depth mapping with stereoscopic assistance" filed Jul. 28, 2010.
Japanese Patent Application # 2011-517308 Official Action dated Dec. 5, 2012.
U.S. Appl. No. 12/844,864 Official Action dated Dec. 6, 2012.
U.S. Appl. No. 12/758,047 Official Action dated Oct 25, 2012.
U.S. Appl. No. 13/036,023 Official Action dated Jan. 7, 2013.
Korean Patent Application # 10-2008-7025030 Office Action dated Feb. 25, 2013.
U.S. Appl. No. 12/707,678 Office Action dated Feb. 26, 2013.
U.S. Appl. No. 12/758,047 Office Action dated Apr. 25, 2013.
U.S. Appl. No. 12/844,864 Office Action dated Apr. 11, 2013.
U.S. Appl. No. 12/522,171 Official Action dated Apr. 5, 2012.
U.S. Appl. No. 12/397,362 Official Action dated Apr. 24, 2012.
International Application PCT/IB2011/053560 Search Report dated Jan. 19, 2012.
International Application PCT/IB2011/055155 Search Report dated Apr. 20, 2012.
U.S. Appl. No. 13/311,589, filed Dec. 6, 2011.
U.S. Appl. No. 13/437,977, filed Apr. 3, 2012.
U.S. Appl. No. 61/598,921, filed Feb. 15, 2012.
Richardson, W. H., "Bayesian-Based Iterative Method of Image Restoration", Journal of the Optical Society of America, vol. 62, No. 1, pp. 55-59, Jan. 1972.
Omnivision Technologies Inc., "OV2710 1080p/720p HD Color CMOS Image Sensor with OmniPixel3-HS Technology", Dec. 2011.
Engfield, N., "Use of Pseudorandom Encoded Grid in U.S. Appl. No. 11/899,542", Andrews Robichaud, Jun. 22, 2011.
U.S. Appl. No. 61/471,215, filed Apr. 4, 2011.
Chinese Patent Application # 200680038004.2 Official Action dated Aug. 3, 2011 (English translation).
International Application PCT/IB2011/053560 filed on Aug. 10, 2011.
U.S. Appl. No. 61/419,891, filed Dec. 6, 2010.
U.S. Appl. No. 61/415,352, filed Nov. 19, 2010.
Lavoie et al., "3-D Object Model Recovery From 2-D Images Using Structured Light", IEEE Transactions on Instrumentation and Measurement, vol. 53, No. 2, pp. 437-443, Apr. 2004.
Chinese Application # 200780016625.5 Office Action dated May 12, 2011.
U.S. Appl. No. 11/899,542 Office Action dated Apr. 4, 2011.
U.S. Appl. No. 11/724,068 Office Action dated Mar. 1, 2011.
Chinese Application # 200780009053.8 Office Action dated Mar. 10, 2011.
Japanese Application # 2008535179 Office Action dated Apr. 1, 2011.
Kun et al., "Gaussian Laser Beam Spatial Distribution Measurement by Speckles Displacement Method", HICH Power Laser and Particle Beams, vol. 12, No. 2, Apr. 2000.
U.S. Appl. No. 12/844,864 Office Action dated Sep. 26, 2013.
U.S. Appl. No. 13/921,224 Office Action dated Oct. 3, 2013.

* cited by examiner

DEPTH-BASED GAIN CONTROL

CROSS-REFERENCE TO RELATED APPLICATION

This application claims the benefit of U.S. Provisional Patent Application 61/267,050, filed Dec. 6, 2009, which is incorporated herein by reference.

FIELD OF THE INVENTION

The present invention relates generally to computer vision, and specifically to three-dimensional (3D) mapping and imaging.

BACKGROUND OF THE INVENTION

Various methods are known in the art for optical 3D mapping, i.e., generating a 3D profile of the surface of an object by processing an optical image of the object. This sort of 3D profile is also referred to as a depth map or depth image, and 3D mapping is also referred to as depth mapping.

Some methods of 3D mapping are based on projecting a laser speckle pattern onto the object, and then analyzing an image of the pattern on the object. For example, PCT International Publication WO 2007/043036, whose disclosure is incorporated herein by reference, describes a system and method for object reconstruction in which a coherent light source and a generator of a random speckle pattern project onto the object a coherent random speckle pattern. An imaging unit detects the light response of the illuminated region and generates image data. Shifts of the pattern in the image of the object relative to a reference image of the pattern are used in real-time reconstruction of a 3D map of the object. Further methods for 3D mapping using speckle patterns are described, for example, in PCT International Publication WO 2007/105205, whose disclosure is also incorporated herein by reference.

Other methods of optical 3D mapping project different sorts of patterns onto the object to be mapped. For example, PCT International Publication WO 2008/120217, whose disclosure is incorporated herein by reference, describes an illumination assembly for 3D mapping that includes a single transparency containing a fixed pattern of spots. A light source transilluminates the transparency with optical radiation so as to project the pattern onto an object. An image capture assembly captures an image of the pattern on the object, and the image is processed so as to reconstruct a 3D map of the object.

Still other methods of 3D mapping use a stereoscopic approach: Typically, two or more cameras at different positions capture respective images of the object. A computer analyzes the images to find the relative pixel offset of features of the object between the two images. The depths of the features are proportional to the respective offsets.

Automatic gain control (AGC) is used in many electronic imaging cameras. Various methods of AGC for such purposes are known in the art. For example, U.S. Pat. No. 5,712,682, whose disclosure is incorporated herein by reference, describes a system for generating a digital output signal representing a captured image. A sensor captures the image and generates a sensor output signal. A gain control amplifier is coupled to the sensor and receives the sensor output signal. The gain control amplifier has controls for applying various levels of gain to the sensor output signal. An analog-to-digital converter (ADC) is coupled to the gain control amplifier and generates the digital output signal representing the captured image. A processor, coupled to the ADC and the gain control amplifier, provides a control signal to the gain control amplifier for adjusting the level of gain applied by the amplifier.

As another example, U.S. Pat. No. 6,750,906, whose disclosure is incorporated herein by reference, describes an image processor system for a charge coupled device (CCD) or CMOS imaging system. The image processor system includes a histogram-based AGC circuit, which controls gain by adjusting the imaging system and adjusting a variable gain amplifier (VGA), as well as shutter timing for shutter gain.

SUMMARY

In image-based depth mapping systems, the quality of the depth information typically depends, inter alia, on the quality of the images that are captured and processed to generate the depth maps. Embodiments of the present invention that are described hereinbelow provide methods, apparatus and software that are useful in this regard.

There is therefore provided, in accordance with an embodiment of the present invention, a method for depth mapping, including capturing an electronic image of a scene using an imaging device. The electronic image is processed to generate depth data with respect to the scene, and a gain of the imaging device is set responsively to the depth data.

In a disclosed embodiment, capturing the electronic image includes projecting a pattern of optical radiation onto the scene, and processing the electronic image includes computing the depth data based on transverse shifts of the pattern in the image.

In some embodiments, processing the electronic image includes creating and outputting a depth map of the scene. Typically, setting the gain includes extracting a representative depth value from the depth map, and selecting the gain responsively to the representative depth value. Extracting the representative depth value may include computing a histogram of the depth data in the depth map, and selecting the representative depth value based on a set of high-frequency bins in the histogram.

In a disclosed embodiment, setting the gain includes selecting a pre-calibrated gain value based on the depth data. The method may include, prior to capturing the electronic image of the scene, computing gain calibration data by capturing and processing multiple images of a calibration object placed at different, respective distances from the imaging device, wherein the pre-calibrated gain value is selected based on the gain calibration data.

There is also provided, in accordance with an embodiment of the present invention, apparatus for depth mapping, including an imaging device, which is configured to capture an electronic image of a scene. A processor is configured to process the electronic image in order to generate depth data with respect to the scene, and to set a gain of the imaging device responsively to the depth data.

The present invention will be more fully understood from the following detailed description of the embodiments thereof, taken together with the drawings in which:

DETAILED DESCRIPTION OF EMBODIMENTS

The quality of the depth data that are generated by all sorts of image-based depth mapping systems depends on the quality of the electronic images captured by the system. The image quality can be particularly critical in systems that are based on projecting a pattern of light onto the scene of interest, such as the systems described in the PCT publications cited above. It is important in these systems that the imaging device produce an image of the scene in which the pattern appears with sufficient contrast between light and dark areas. If the gain of the imaging device is too high, bright areas will be washed out by saturation, whereas if the gain is too low, the pattern in dim areas may be masked by noise.

Due to the laws of physics, the brightness of the pattern that appears in the captured image drops strongly with increasing depth. Methods of AGC that are known in the art do not take this depth dependence into account and may therefore fail to achieve optimal contrast of the pattern in images of the patterned scene. Embodiments of the present invention, on the other hand, take the depth of objects in the scene into account explicitly: As explained in detail below, the electronic images captured by the imaging device are processed to generate depth data with respect to the scene, and the gain of the imaging device is then set responsively to the depth data.

System Description

Figure 1:
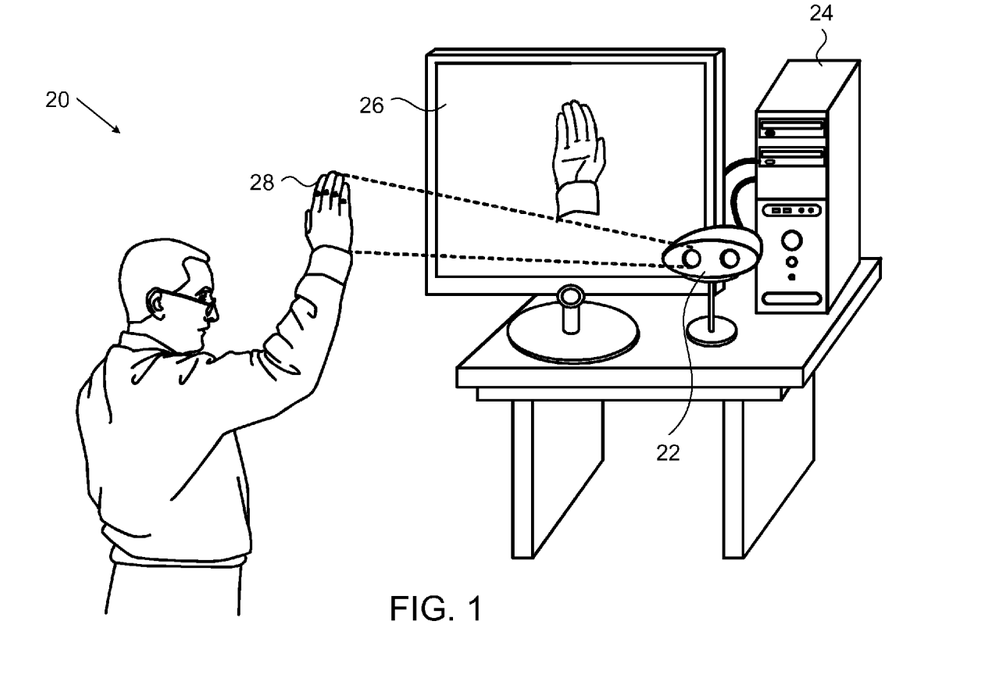
FIG. 1 is a schematic, pictorial illustration of a system for three-dimensional (3D) mapping, in accordance with an embodiment of the present invention.

FIG. 1 is a schematic, pictorial illustration of a system 20 for 3D mapping, in accordance with an embodiment of the present invention. In this example, an imaging device 22 is configured to capture images and generate 3D maps of a scene. The scene here includes a user 28 of the system (who is thus, in this case, the "object" of the imaging device, as well as its operator). The depth information in the 3D maps may be used by a host computer 24 as part of a 3D user interface, which enables the user to interact with games and other applications running on the computer and with elements shown on a display screen 26. (This sort of functionality is described, for example, in U.S. Patent Application Publication 2009/0183125, whose disclosure is incorporated herein by reference.) This particular application of system 20 is shown here only by way of example, however, and the mapping capabilities of system 20 may be used for other purposes, as well, and applied to substantially any suitable type of scenes and 3D objects.

In the example shown in FIG. 1, imaging device 22 projects a pattern of optical radiation onto the scene, and captures an image of the pattern that consequently appears on the body of user 28 and other objects in the scene (not shown in the figures). The optical radiation that is used for this purpose is typically, although not necessarily, in the infrared (IR) range, although visible or ultraviolet light may similarly be used. A processor in device 22, whose functionality is described in greater detail hereinbelow, processes the image of the pattern in order to generate a depth map of the body, i.e., an array of 3D coordinates, comprising a depth (Z) coordinate value of the body surface at each point (X,Y) within a predefined field of view. (In the context of an array of image-related data, these (X,Y) points are also referred to as pixels.) In the present embodiment, the processor computes the 3D coordinates of points on the surface of the user's body by triangulation, based on transverse shifts of the spots in the pattern, as described in the above-mentioned PCT publications WO 2007/043036, WO 2007/105205 and WO 2008/120217. This technique is referred to herein as "pattern-based depth mapping."

Figure 2:
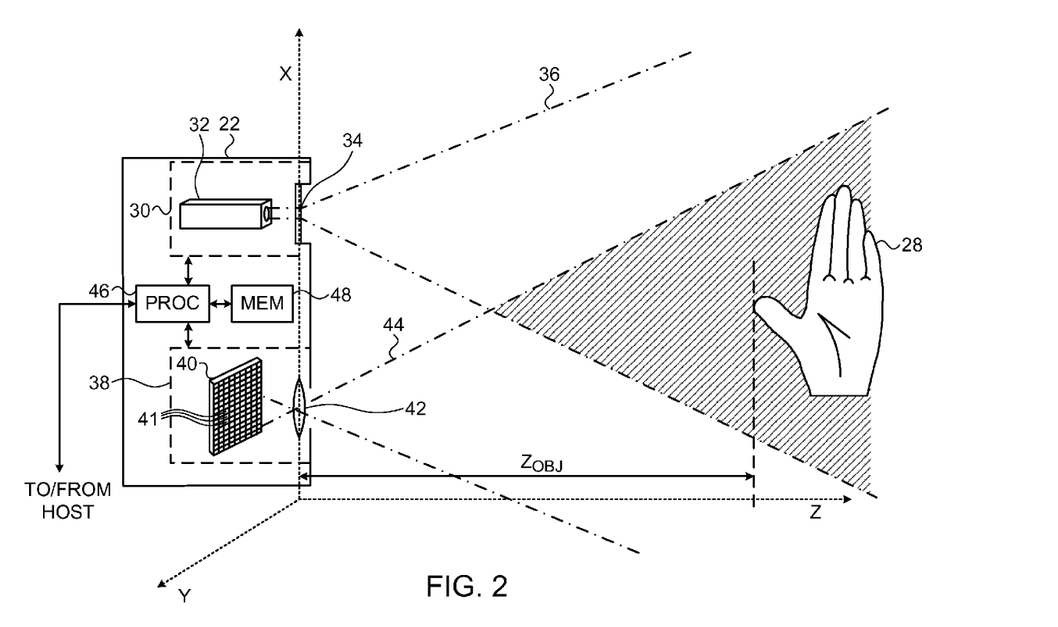
FIG. 2 is a schematic top view of an imaging device for use in 3D mapping, in accordance with an embodiment of the present invention.

FIG. 2 is a schematic top view of imaging device 22, in accordance with an embodiment of the present invention. Here the X-axis is taken to be the horizontal direction along the front of device 22, the Y-axis is the vertical direction (out of the page in this view), and the Z-axis extends away from device 22 in the general direction of the object being imaged by the assembly.

For 3D mapping, an illumination subassembly 30 illuminates the scene of interest with an appropriate pattern, such as a speckle pattern. For this purpose, subassembly 30 typically comprises a suitable radiation source 32, such as a diode laser, LED or other light source, along with optics, such as a diffuser 34 or a diffractive optical element, for creating the pattern, as described in the above-mentioned PCT publications. The pattern is projected onto the scene in a diverging beam 36.

An image capture subassembly 38 captures an image of the pattern on the surface of objects in the scene. Subassembly 36 typically comprises objective optics 42, which image the scene onto a detector 40, such as a CMOS image sensor, comprising a matrix of detector elements 41. The image sensor and objective optics define a field of view 44, which is typically contained within beam 36 in the region of interest of system 20.

As noted above, radiation source 32 typically emits IR radiation. Detector 40 may comprise a monochrome image sensor, without an IR-cutoff filter (not shown), in order to detect the image of the projected pattern with high sensitivity. To enhance the contrast of the image captured by detector 40, optics 42 or the detector itself may comprise a bandpass filter, which passes the wavelength of radiation source 32 while blocking ambient radiation in other bands.

A processor 46 receives and processes an electronic image input from subassembly 38. Processor 46 typically comprises an embedded microprocessor, which is programmed in software (or firmware) to carry out the processing functions that are described hereinbelow. The software may be provided to the processor in electronic form, over a network, for example; alternatively or additionally, the software may be stored on tangible computer-readable media, such as optical, magnetic, or electronic memory media. Processor 46 also comprises suitable input and output interfaces and may comprise dedicated and/or programmable hardware logic circuits for carrying out some or all of its functions. Details of some of these processing functions and circuits that may be used to carry them out are presented in U.S. Patent Application Publication 2010/0007717, whose disclosure is incorporated herein by reference.

Briefly put, processor 46 compares the image provided by subassembly 38 to a reference image of the pattern projected by subassembly 30 onto a reference plane at a known distance from device 22. (The reference image may be captured in advance as part of a calibration procedure and stored in a memory 48, for example.) The processor matches the local patterns in the captured image to those in the reference image and thus finds the transverse shift for each pixel, or group of pixels, within the plane. Based on these transverse shifts and on the known distance between the optical axes of subassemblies 30 and 38, the processor computes a depth (Z) coordinate for each pixel. Further details of a computational approach for converting transverse shifts of the pattern to depth values are presented in the above-mentioned provisional patent application.

Alternatively, other system configurations may be used for generating depth maps and are considered to be within the scope of the present invention. For example, the imaging device used in system may comprise two or more image sensors (not shown) and be configured on this basis to generate stereoscopic depth data, instead of or in addition to the pattern-based depth data. For this purpose, the processor may apply any method of stereoscopic processing that is known in the art. A method that uses both pattern-based and stereoscopic depth mapping techniques, which may be implemented by processor 46 in this context, is described in U.S. patent application Ser. No. 12/844,864, filed Jul. 28, 2010, which is assigned to the assignee of the present patent application and whose disclosure is incorporated herein by reference.

The intensity of the pattern in the images captured by subassembly 38 depends, among other parameters, on the distance of the object, $Z_{OBJ}$, from device 22. (Since the distance between subassemblies 30 and 38 is typically much smaller than the distance to the object, we will assume that the distance from the object to the two subassemblies is equal, and refer to this distance as the distance from imaging device 22.) When an object is close to the imaging device, the intensity of the reflected light will be high and may saturate detector 40. When the object is distant, the reflected light intensity will be low, and the contrast between bright and dark parts of the pattern may therefore be close to the noise level.

In order to avoid saturation, as well as to enhance the visibility of the pattern in the captured images when the object is far away, processor 46 uses the distance (depth) from device 22 to object 28, $Z_{OBJ}$, in determining the gain that will be used in image capture subassembly 38. The overall gain may be determined by a single setting or by a combination of settings, which may include, for example, the electronic shutter speed and gain of on-board amplifiers in detector 40, as well as the gain of analog front-end and digital processing circuits (not shown) between detector 40 and processor 46. The term "gain," as used in the context of the present patent application and in the claims, should therefore be understood broadly to include any and all settings that affect the relation between the radiation intensity that is incident on detector elements 41 and the magnitude of the corresponding electronic output signals (analog or digital). Methods for calibrating and applying depth-based gain are described hereinbelow. These methods may be used by themselves or in conjunction with AGC methods and circuits that are known in the art.

Methods for Depth-Based Gain Control

Figure 3:
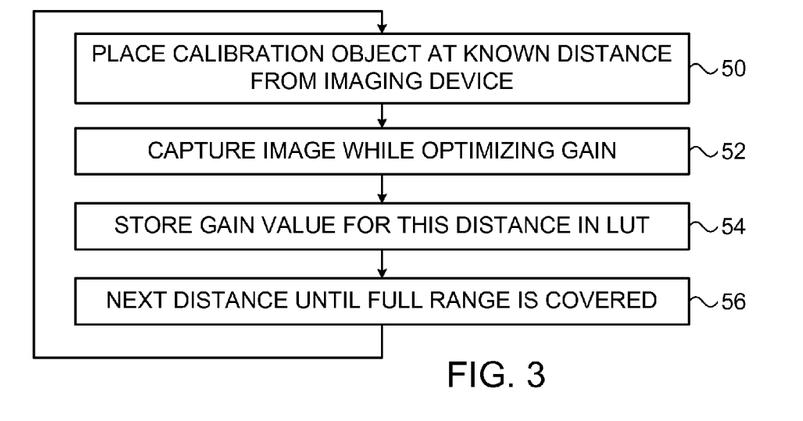
FIG. 3 is a flow chart that schematically illustrates a method for gain calibration, in accordance with an embodiment of the present invention.
Figure 4:
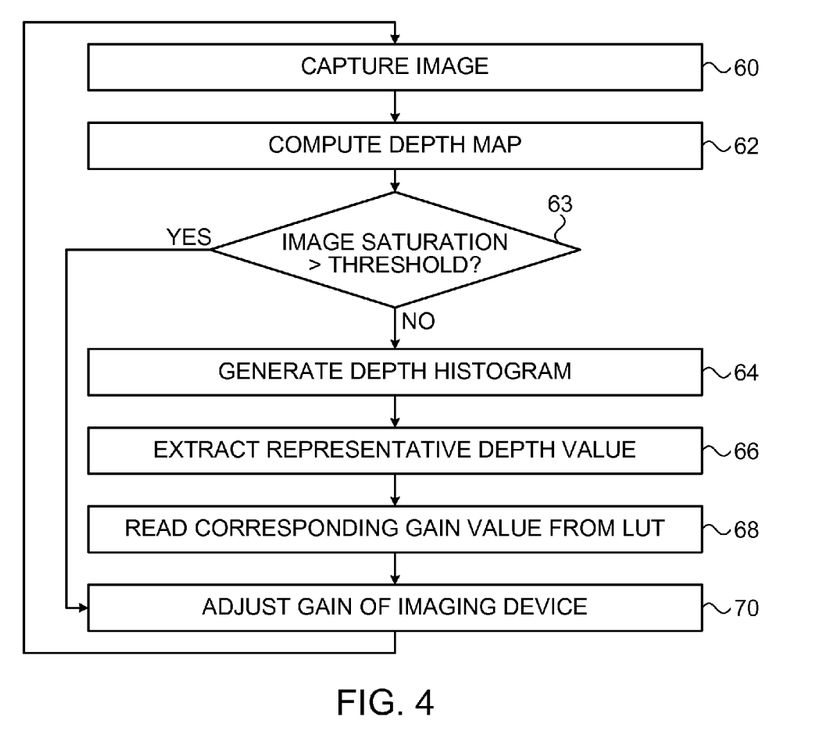
FIG. 4 is a flow chart that schematically illustrates a method for gain control, in accordance with an embodiment of the present invention.

FIG. 3 is a flow chart that schematically illustrates a method for gain calibration, in accordance with an embodiment of the present invention. This method is used to compute the parameters of a gain adjustment function, which are then stored in a look-up table (LUT) in memory 48. For convenience and clarity of description, this method and the method of FIG. 4 are described with reference to specific elements of system 20, as illustrated and described above. The principles of these methods, however, may be implemented in substantially any sort of image-based depth mapping system. All such implementations are considered to be within the scope of the present invention.

The method of FIG. 3 uses a calibration object, such as a flat, diffusely reflecting screen. In one embodiment, the object is a Lambertian reflector with reflectivity close to 100%. To begin the calibration procedure, the calibration object is placed at a known distance from imaging device 22, at an object placement step 50. Illumination subassembly 30 in device 22 is operated to project the appropriate pattern onto the calibration object, and image capture subassembly 38 meanwhile captures electronic images of the calibration object, at an image capture step 52. During this step, the gain of subassembly 38 is optimized to bring the pixel values in the output image into a desired range. For example, the gain may be adjusted so that the gray-scale value of the brightest pixels in the output image is 80% of the maximum possible value (i.e., 80% of the saturation limit). Alternatively, other criteria may be used in setting the gain.

The gain value found at step 52 is typically stored in memory 48, in a LUT containing gain settings as a function of object distance, at a table storage step 54. Alternatively, the gain value that is stored for each distance may be reduced by a certain factor, relative to the value that was found at step 52, in order to prevent the image from saturating when there is strong ambient light in the scene. Typically, the reduction factor is between 1.5 and 4. For example, if the factor is chosen to be 2, then the gain for each distance will be the value that would have brought the gray level during calibration to 80%/2=40% of the saturation level.

The steps above are repeated for multiple different distances of the calibration object, until the full range of interest is covered, at a completion step 56. For thorough and precise coverage, the object distance may be stepped over the entire depth measurement range of device 22, from minimum to maximum depth. The size of the steps may be as small as 0.1% of the maximum depth for precise calibration, or they may be larger depending on application requirements and the capacity of memory 48.

The calibration method of FIG. 3 is typically carried out at the time of manufacture of imaging device 22, but such calibration may, alternatively or additionally, be performed in the field. In a production run of imaging devices, the calibration method may be applied to each device individually, or it may be performed on only one or a few of the devices in order to compute calibration parameters to be stored by all of the devices.

FIG. 4 is a flow chart that schematically illustrates a method for gain control, in accordance with an embodiment of the present invention. This method uses the gain LUT (or other gain parameters) that were computed and stored in memory 48 using the method of FIG. 3. Illumination subassembly 30 in imaging device 22 projects patterned illumination onto the scene of interest, and image capture subassembly 38 captures an image of the pattern on the scene, at an image capture step 60. Processor 46 processes the captured image to create a depth map of the scene, at a depth map computation step 62.

Processor 46 checks whether the image captured by detector 40 at step 60 was saturated, at a saturation checking step 63. For example, the processor may compute a histogram of the gray levels of the image, or over a certain region of interest in the image. If the number of pixels at saturation levels is above a predetermined threshold (for example, more than 1% of the pixels are saturated), the processor will reduce the gain by a certain factor, such as 20%, at a gain adjustment step 70.

If the image is not saturated, processor 46 uses the depth data in the depth map to adjust the gain of device 22. Typically, this computation is based on a statistical analysis, such as a histogram of the depth values, which the processor computes at a statistical computation step 64. This histogram of depth values may be calculated over the entire depth map or only over a part of the volume that is mapped by the sensor.

For example, a 3D region of interest may be defined, over which the depth histogram is then computed. Based on the statistical analysis, the processor chooses a representative depth value for the scene, at a value extraction step 66. In one embodiment, the processor identifies the bins in the histogram having the highest frequencies, and choose the representative depth value based on the depth values of these bins. For example, the processor may set the representative depth value equal to the average depth value of the bins in the highest percentile of frequency. Alternatively, other suitable statistical measures may be used in computing the representative depth value.

For the representative depth value calculated at step 66, processor 46 looks up the nearest depth value in the LUT in memory 48, at a lookup step 68. The processor reads out the corresponding calibrated gain value and then sets the gain of imaging device 22 to this calibrated value, at gain adjustment step 70. Alternatively, when the representative depth value falls in between two of the depth values in the table, the processor may read out two or more of the calibrated gain values and interpolate to find the optimal gain setting. Further alternatively, the calibration data stored in memory 48 may comprise parameters of an analytical function of the depth, and the processor computes the value of this analytical function in order to adjust the gain.

The gain value computed and set at step 70, whether due to saturation detected at step 63 or to the representative depth value found at step 66, will be applied to the next image captured by device 22 at step 60. (When the method of FIG. 4 is implemented in hardware logic, steps 64-68 may be carried out over all depth maps, and the result of step 68 may simply be overridden when the image is found to have been saturated.) Because object depth in the scene tends to change slowly, the gain setting that is made in this way is likely to be nearly optimal for subsequent images.

Referring back to the choice of optimal gain setting made at step 52, the choice of a gain that causes a perfect Lambertian reflector to reach about 80% of the saturation level is useful in that it ensures that images of diffusely-reflecting objects in the scene, with reflectance up to 100%, will not be saturated. It is possible that a strong specular reflector in the scene will still result in an area of saturation. In practice, however, objects of this sort are not usually encountered, and extracting their depth values from an image that is captured using means like device 22 is difficult or impossible in any case.

When the image captured by device 22 is either saturated or very dark, the method of FIG. 4 may not give good results, since processor 46 may be unable to compute meaningful depth values over much or even all of the scene. Therefore, as a preliminary step, the processor may apply a conventional AGC algorithm, such as those described in the patents cited in the Background section, in order to make an initial gain setting before beginning to find depth-based gain values.

Although the embodiments described above are directed to adjustment of the gain of image capture subassembly 38, similar calibration and adjustment procedures may be used, alternatively or additionally, to control the intensity of the radiation output by illumination assembly 30 in imaging device 22 as a function of the distance of an object from the imaging device. Furthermore, the techniques described above may be applied, mutatis mutandis, in controlling the gain of an imaging device on the basis of other sorts of depth data, such as ranging measurements made using a time-of-flight detector or using any other suitable technique that is known in the art.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for depth mapping, comprising:
capturing an image of a scene using an imaging device, which comprises a matrix of detector elements and which is configured to output an electronic signal representing the captured image, wherein the imaging device has a gain that determines a relation between an intensity of radiation incident on the detector elements and a magnitude of the electronic signal;
processing the electronic signal output by the imaging device in response to a first image to generate depth data with respect to the scene; and
setting the gain of the imaging device that is to be applied to one or more second images, captured subsequently to the first image by selecting a pre-calibrated gain value based on the depth data.

2. The method according to claim 1, wherein capturing the electronic image comprises projecting a pattern of optical radiation onto the scene, and wherein processing the electronic signal comprises computing the depth data based on transverse shifts of the pattern in the image.

3. The method according to claim 1, wherein processing the electronic signal comprises creating and outputting a depth map of the scene.

4. The method according to claim 3, wherein setting the gain comprises extracting a representative depth value from the depth map, and selecting the gain responsively to the representative depth value.

5. The method according to claim 4, wherein extracting the representative depth value comprises computing a histogram of the depth data in the depth map, and selecting the representative depth value based on a set of high-frequency bins in the histogram.

6. The method according to claim 1, and comprising, prior to capturing the electronic image of the scene, computing gain calibration data by capturing and processing multiple images of a calibration object placed at different, respective distances from the imaging device, wherein the pre-calibrated gain value is selected based on the gain calibration data.

7. Apparatus for depth mapping, comprising:
an imaging device, which comprises a matrix of detector elements configured to capture an image of a scene and which is configured to output an electronic signal representing the captured image, wherein the imaging device has a gain that determines a relation between an intensity of radiation incident on the detector elements and a magnitude of the electronic signal; and
a processor, which is configured to process the electronic signal output by the imaging device in response to a first image in order to generate depth data with respect to the scene, and to set the gain of the imaging device that is to be applied to one or more second images, captured subsequently to the first image, by selecting a pre-calibrated gain value based on the depth data.

8. The apparatus according to claim 7, wherein the imaging device is configured to project a pattern of optical radiation onto the scene, and wherein the processor is configured to compute the depth data based on transverse shifts of the pattern in the image.

9. The apparatus according to claim 7, wherein the processor is configured to create and output a depth map of the scene, comprising the depth data, based on the electronic image.

10. The apparatus according to claim 9, wherein the processor is configured to extract a representative depth value from the depth map, and to select the gain responsively to the representative depth value.

11. The apparatus according to claim 10, wherein the processor is configured to compute a histogram of the depth data in the depth map, and to select the representative depth value based on a set of high-frequency bins in the histogram.

12. The apparatus according to claim 7, wherein prior to capturing the electronic image of the scene, gain calibration data are computed by capturing and processing multiple images of a calibration object placed at different, respective distances from the imaging device, wherein the processor is configured to select the pre-calibrated gain value based on the gain calibration data.

* * * * *